(12) United States Patent
Eardley et al.

(10) Patent No.: US 8,374,330 B2
(45) Date of Patent: Feb. 12, 2013

(54) CALL CONTROL

(75) Inventors: Philip L Eardley, Ipswich (GB); Simon P A Ringland, Ipswich (GB); Matthew D Walker, Felixstowe (GB)

(73) Assignee: British Telecommunications plc, London (GB)

( * ) Notice: Subject to any disclaimer, the term of this patent is extended or adjusted under 35 U.S.C. 154(b) by 0 days.

(21) Appl. No.: 13/262,383

(22) PCT Filed: Mar. 11, 2010

(86) PCT No.: PCT/GB2010/000444
§ 371 (c)(1),
(2), (4) Date: Sep. 30, 2011

(87) PCT Pub. No.: WO2010/112805
PCT Pub. Date: Oct. 7, 2010

(65) Prior Publication Data
US 2012/0033798 A1   Feb. 9, 2012

(30) Foreign Application Priority Data

Mar. 30, 2009 (GB) .................................. 0905456.0

(51) Int. Cl.
| | |
|---|---|
| H04M 3/46 | (2006.01) |
| H04M 3/54 | (2006.01) |
| H04M 7/00 | (2006.01) |
| H04L 12/16 | (2006.01) |
| H04L 12/66 | (2006.01) |

(52) U.S. Cl. .................... 379/211.01; 370/259; 370/354; 370/401; 379/207.03; 379/211.02; 379/220.01; 379/221.01; 455/417

(58) Field of Classification Search ............. 379/211.01, 379/220.01, 207.02, 207.03, 221.02–211.05; 370/259, 351–357, 401; 455/414.1, 417
See application file for complete search history.

(56) References Cited

FOREIGN PATENT DOCUMENTS

| | | |
|---|---|---|
| EP | 0 550 975 A2 | 7/1993 |
| EP | 0 637 159 | 2/1995 |

(Continued)

OTHER PUBLICATIONS

Search Report (1 pg.) dated Jun. 2, 2009 issued in GB 0905456.0.

(Continued)

*Primary Examiner* — Harry Hong
(74) *Attorney, Agent, or Firm* — Nixon & Vanderhye PC

(57) ABSTRACT

A method of call control in which a first communications network, detecting calls directed to a destination in the first network; redirects at least some of the calls to a destination in a second network (e.g. on no answer from the destination in the first network). The first network then operates in two phases. In a first phase, for a group of calls redirected to the second network, the time delay before the call is answered in the second network is recorded. When a number of time delays have been recorded, a delay period is set to a value less than the maximum value of the recorded time delays. In a second phase, for a second group of calls redirected to the second network subsequent to the calls of the first group, when a call of the second group is not answered in the second network within the delay period, the call is redirected to a message service associated with the first network.

16 Claims, 3 Drawing Sheets

U.S. PATENT DOCUMENTS

| | | | |
|---|---|---|---|
| 6,021,176 | A | 2/2000 | McKendry et al. |
| 6,438,214 | B1 | 8/2002 | Yun |
| 6,584,110 | B1 * | 6/2003 | Mizuta et al. ............... 370/401 |
| 6,856,806 | B1 | 2/2005 | Bosik et al. |
| 7,340,040 | B1 | 3/2008 | Saylor et al. |
| 2004/0017803 | A1 | 1/2004 | Lim et al. |
| 2004/0209606 | A1 | 10/2004 | Cleary et al. |
| 2005/0117731 | A1 | 6/2005 | Pearson |
| 2006/0008059 | A1 | 1/2006 | Ying et al. |
| 2007/0010233 | A1 | 1/2007 | Wang et al. |
| 2007/0060137 | A1 | 3/2007 | Yeatts et al. |
| 2007/0070976 | A1 | 3/2007 | Mussman et al. |
| 2007/0147595 | A1 | 6/2007 | Daniell |
| 2010/0119047 | A1 * | 5/2010 | Pike et al. ............... 379/93.03 |

FOREIGN PATENT DOCUMENTS

| | | |
|---|---|---|
| WO | 00/39990 | 7/2000 |
| WO | 2005/055488 A2 | 6/2005 |

OTHER PUBLICATIONS

Written Opinion and International Preliminary Report on Patentability issued in International Application No. PCT/GB2010/000444 (5 pgs.).

Written Opinion, International Preliminary Report on Patentability and International Search Report dated May 31, 2010 issued in International Application No. PCT/GB2020/000434 (10 pgs.).

Search Report (2 pgs.) dated Jul. 6, 2009 issued in GB 0905454.5.

Tru (mobile network), Wikipedia internet article retrieved Jan. 25, 2012 from: http://en.wikipedia.org/wiki/Tru (mobile network).

3GPP TS 24.228 V5.15.0 (Sep. 2006), Technical Specification, $3^{rd}$ Generation Partnership Project; Technical Specification Group Core Network and Terminals; Signalling flows for the IP multimedia call control based on Session Initiation Protocol (SIP) and Session Description Protocol (SDP); Stage 3 (Release 5).

International Search Report for PCT/GB2010/000444, mailed May 12, 2010.

* cited by examiner

CALL CONTROL

This application is the U.S. national phase of International Application No. PCT/GB2010/000444 filed 11 Mar. 2010 which designated the U.S. and claims priority to GB 0905456.0 filed 30 Mar. 2009, the entire contents of each of which are hereby incorporated by reference.

BACKGROUND

1. Technical Field

The present invention relates to the field of telephony networks in general and to the control of calls in telephony networks in particular.

2. Related Art

An increasing number of telephone subscribers have more than one telephony account, benefiting from the increased flexibility and improved accessibility that multiple accounts can provide. For example, a subscriber may have a first, Wi-Fi telephony account and a second, GSM telephony account (a list of acronyms is provided at the end of the description). In such a telephony system, the Wi-Fi account can often be out of operation either because the Wi-Fi handset is switched off or is out of range of the nearest Wi-Fi access point (or "hotspot"). It is, therefore, convenient for the user, when their Wi-Fi telephony account is unavailable, for calls directed to the user at their Wi-Fi account to be redirected to a second telephony account, e.g., one provided via the GSM networks. A problem arises in the case of such re-directed calls when the call is not answered at the handset operating on the second network to which the call has been redirected. The default behavior of a telephony system in this situation would be for the call to be forwarded to a messaging service, e.g.: voicemail service, associated with the handset in the second network, to which the call has been diverted. This behavior, however, can lead to confusion for the user with messages, which should be associated with, and directly accessible from, their Wi-Fi handset, being instead associated with their GSM handset. The default behavior can also result in extra cost to the user where the user is liable to pay the mobile operator for a second diversion from the mobile network back to the redirecting network. Similar problems can occur with other combinations of telephony accounts, such as GSM with PSTN, where calls to the user may be redirected to the PSTN, when the user's GSM handset is switched off or out of range of a GSM transmitter.

The behavior described above may be less of a problem where both handsets are provided by the same service provider. Published patent application US 2007/0070976 describes a telecommunication system in which a service provider provides both a mobile network and a VoIP network interlinked via a PSTN backbone. Both networks provide telephony services to a user. According to this telecommunication system, calls to the user directed to a terminal on the fixed network may be delivered to a terminal associated with that user on the mobile network. If the call is not completed to the second terminal on the mobile network, the mobile network is able to detect this and to return the call to the fixed network, where it is forwarded to a messaging service on the fixed network.

The telecommunication system of U.S. Pat. No. '976 should work for users who have dual accounts from the same service provider. For example, "TruPhone" from Software Cellular Network, London, England is a service that provides a software application for mobile phones. This application provides end-users with a second Voice-over IP account, which works alongside an existing mobile phone account. In practice, not all users will have dual accounts from the same service provider and not all networks will be set up like the second network of U.S. Pat. No. '976. In a situation where the user has a first account with a first service provider operating a first network and a second account with a second service provider operating a second network, the above system may not work if, as is likely, there is no overall, control mechanism that allows the second network to be aware that an incoming call has been redirected from another network or to be alert to the need to return the call, if unanswered, to a messaging service in the other network.

BRIEF SUMMARY

A method of call control and a call control system is proposed according to which a first network is able to retrieve an unanswered call before the call is forwarded to a messaging service by a second network, where the call is originally intended for a destination in the first network and has been transferred to a destination in the second network.

According to an exemplary method, a first communications network detects calls directed to a destination in the first network and redirects at least some of the calls to a destination in a second network (e.g., on no answer from a destination in the first network). The first network operates in two phases. In a first phase, for a group of calls redirected to the second network, the time delay before the call is answered in the second network is recorded. When a number of time delays have been recorded, a delay period is set to a value less than the maximum value of the recorded time delays. In a second phase, for a second group of calls redirected to the second network subsequent to the calls of the first group, when a call of the second group is not answered in the second network within the delay period, the call is redirected to a message service or other, alternative destination associated with the first network.

The maximum time delay before calls are answered in the second network will be equal to or less than the delay in the second network before a call is transferred to a messaging service. Setting the delay period at which a call is retrieved to the first network to a value less than this maximum means that subsequent calls will be retrieved by the first network before they are transferred to a messaging service by the second network.

The first communications network comprises a network controller for detecting calls directed to a destination in the first network and for redirecting at least some of the calls to a destination in a second network (e.g., on no answer in the first network). The network controller comprises a first timer for recording time delays before each call of a group of calls redirected to the second network is answered in the second network and a second timer which is set to a delay period value less than the maximum value of the time delays recorded by the first timer. The network controller also comprises a switch for redirecting an unanswered call to a message service associated with the first network, where a call from a second group of calls (comprising calls redirected to the second network subsequent to the calls of the first group) is an unanswered call when it is not answered in the second network within the delay period.

The switch is configured to retrieve to the first network a call redirected to the second network when the call is not answered within the delay period. The delay period is set to a value less than the maximum recorded value of time delay before a call redirected to the second network is answered in the second network so that subsequent calls will be retrieved by the first network before they are transferred to a messaging service by the second network.

It is possible that the user or service provider removes or disables the messaging service provided by the second network (effectively equivalent to an infinite value of delay before transfer-to-messaging-service) or, simply, increases the delay before redirection to the messaging service. Advantageously, according to one aspect of the invention, the call control system is able to adapt to increases in the delay in the second network before a call is forwarded to a messaging system in the second network.

Similarly, it is possible that the user or service provider decreases the delay before redirection to the messaging service. Advantageously, according to one aspect of the invention, the call control system is able to adapt to decreases in the delay in the second network before a call is forwarded to a messaging system in the second network.

Under certain circumstances a call, having been redirected to the second network, may be immediately forwarded in the second network to an alternative destination (e.g. voicemail). When a subscriber does not want to be disturbed and has instructed their network operator to divert all calls to their handset in the second network to voicemail without first ringing the subscriber's handset, a call, having been redirected to the second network, is immediately forwarded to a messaging service in the second network. Similarly, when the subscriber's handset in the second network is switched off or is out of range of the wireless network, a call, having been redirected to the second network, is immediately forwarded to a messaging service in the second network. In such cases the delay in the second network before a call is forwarded to the messaging service will be much shorter. Advantageously, according to a further aspect of the invention, when a call of the second set redirected to the second network is answered in the second network within a second delay period shorter than the delay period, the call is redirected in the first network to an alternative destination associated with the first network. According to a further aspect, the timer controller is arranged in use to set a third timer to a second delay period shorter than the delay period and the switch is arranged in use to redirect a call that is answered in the second network within the second delay period to an alternative destination associated with the first network.

For the avoidance of doubt, according to the present exemplary embodiments, redirection of calls to the alternative destination associated with the first network is controlled from the first network.

BRIEF DESCRIPTION OF THE DRAWINGS

To aid understanding of the invention, embodiments will now be described by way of example only, with reference to the accompanying drawings in which.

DETAILED DESCRIPTION OF EXEMPLARY EMBODIMENTS

Figure 1A:
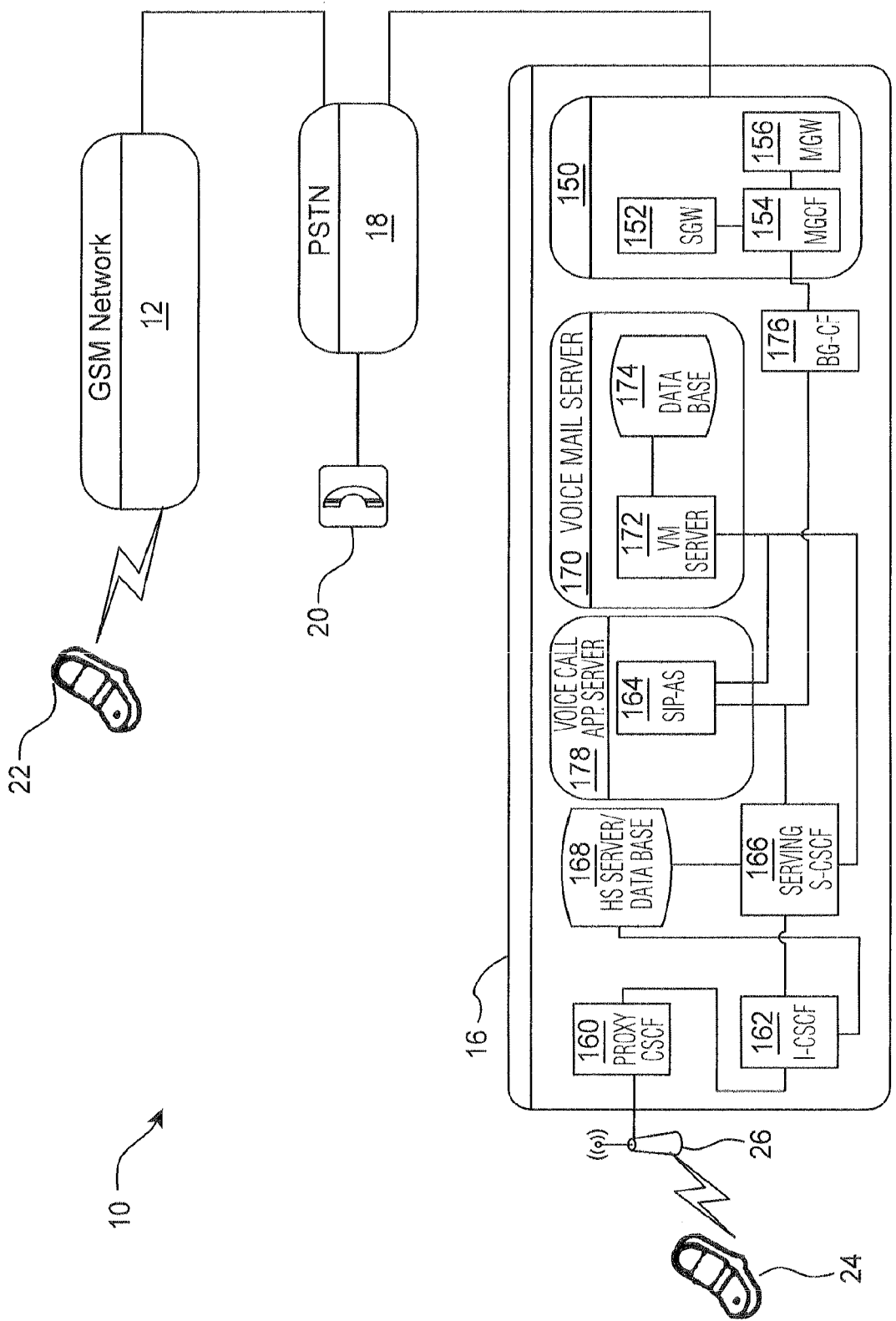
FIGS. 1a and 1b show schematics of communications systems to which the invention may be applied.

FIG. 1a shows a schematic of communications system 10 comprising GSM mobile network 12, IMS mobile network 16 and wire-line PSTN 18. Three handsets are shown, each for use with a different communications network. Conventional, wired handset 20 is attached to provide telephone service via PSTN 18. Handset 22 operates in GSM mode via GSM network 12 and handset 24 operates in Wi-Fi mode via IMS network 16.

IP Multimedia Subsystem (IMS) Network

Figure 1B:
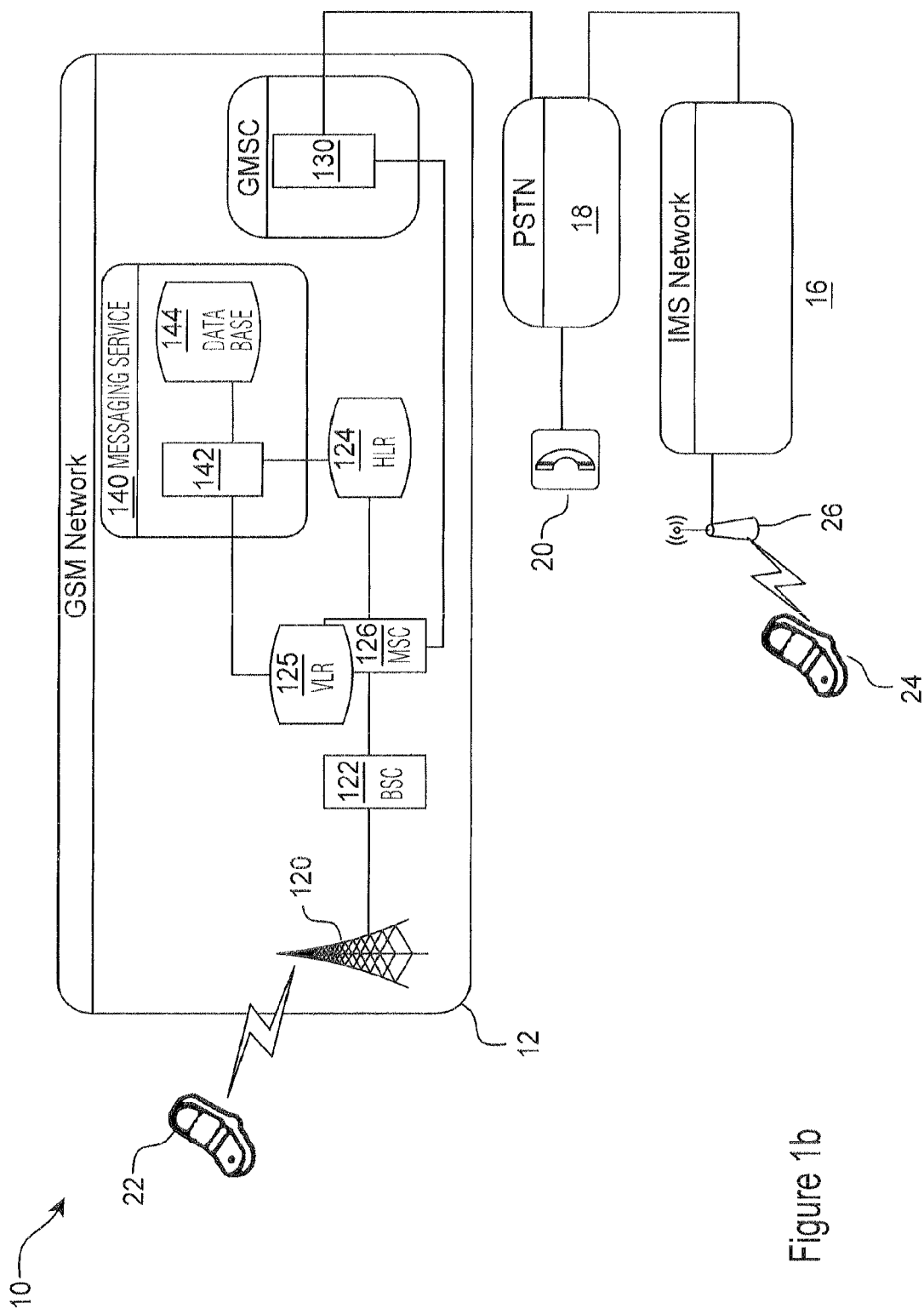

FIG. 1a shows IMS network 16 in detail (GSM network 12 is shown in detail in FIG. 1b). As shown in FIG. 1a, Wi-Fi handset 24 exchanges radio signals with Wi-Fi access point 26 to IMS network 16. Wi-Fi handset 24 needs to register with the IMS network in order to send and receive messages.

Proxy CSCF (P-CSCF) 160 in IMS network 16 forms the interface between Wi-Fi handset 24 and the rest of the IMS network. P-CSCF 160 authenticates the user and acts as a proxy, routing the traffic from Wi-Fi handset 24 to Interrogating-CSCF (I-CSCF) 162. I-CSCF 162 controls IMS connections destined to users subscribed to the network operator of IMS network 16, or to roaming users currently located within that network operator's service area. I-CSCF 162 acts as the administrative boundary of the IMS network (as P-CSCF 160 could be in a roaming partner's network—FIG. 1a showing a simplified view). Wi-Fi handset 24 connects to P-CSCF 160 via Wi-Fi access point 26. P-CSCF 160 authenticates Wi-Fi handset 24 (via I-CSCF 162 using information from Home Subscriber Server (HSS) 168).

HSS 168 comprises a database containing subscription-related information to support call control in IMS network 16. HSS 168 provides support for authentication, authorization, naming/addressing resolution, etc. To achieve this, HSS 168 stores the following user related information: user identification, numbering and addressing information; user security information: network access control information for authentication and authorization; user location information at inter-system level. HSS 168 supports the user registration.

Thereafter P-CSCF 160 acts as a proxy forwarding SIP traffic from handset 24 to I-CSCF 162. I-CSCF 162 locates HSS 168(via a subscriber location function (SLF not shown)) and routes the SIP traffic from Wi-Fi handset 24 to the appropriate instance of Serving-CSCF (S-CSCF) 166.

S-CSCF 166 maintains the session state required by the operator of IMS network 16 in support of session control services for Wi-Fi handset 24. S-CSCF 166 is the main call control element of IMS network 16. It downloads from HSS 168 the user profile which contains a set of triggers that may cause SIP messages to be routed to application servers. Call control functions are implemented by the definition of these triggers and the functions provided by the associated application servers. In the example of FIG. 1a, a trigger might be to route the SIP "invite" message for voice calls to voicemail server 172 if the call hasn't been answered after a specified interval. It is more likely that this function would be implemented by Voice Call application server 178, rather than in S-CSCF 166 itself.

We now consider the placing of an outgoing call and the receipt of an incoming call in IMS network 16.

Outgoing Call from Wi-Fi Handset Via IMS Network.

Wi-Fi handset 24 sends a SIP "invite" message to P-CSCF 160. The "invite" message is routed via P-CSCF 160 and I-CSCF 162 to S-CSCF 166. S-CSCF 166 matches the "invite" message to a trigger and, as a result, may forward the "invite" message to voice call server 178. Connection between IMS network 16 and GSM network 12 is effected via PSTN 18. If the called subscriber is located on GSM network 12, the invite message is redirected to the Breakout Gateway Control Function (BGCF) 176 that is connected to PSTN 18. BGCF 176 selects the appropriate Media Gateway Control Function (MGCF) 154 for the selected PSTN 18. MGCF 154 controls the parts of the call state that pertain to connection control for media channels in MGW 156. Media Gateway (MGW) 156 terminates bearer channels from PSTN 18.

MGW 156 may also support media conversion, bearer control and payload processing. Signalling Gateway (SGW) 152 provides a signalling interface with PSTN 18. The call is thus routed to the PSTN which then routes the call to the Gateway Mobile Switching Centre (GMSC) of the relevant GSM network (as described in more detail, below). It would also be possible for the IMS and mobile networks to be connected directly to each other.

Incoming Call to Wi-Fi Handset Via IMS Network

We describe next, an example of a call received at IMS network 16 from PSTN 18.

An incoming call (from PSTN 18, for example) for handset 24 will result in a SIP "invite" message arriving at the instance of S-CSCF (represented in the drawings by S-CSCF 166) allocated to the handset. In the case of a call input from PSTN 18, the call is input via the appropriate instances of BGCF 176 and MGCF 154. S-CSCF 166 downloads a user profile for the intended recipient from the appropriate instance of HSS (represented in the drawings by HSS 168). The user profile includes initial filter criteria including trigger point data which specify how to handle SIP messages matching specified criteria (e.g.: relating to inbound SIP "invite" messages addressed to the user, as opposed to outgoing SIP "invite" messages). As the incoming call is a voice call, S-CSCF 166 finds a match in the filter criteria trigger points, which indicate that the SIP "invite" message is to be forwarded to voice call server 178, incorporating Session Initiation Protocol Application Server (SIP-AS) 164.

Voice call server 178 checks whether the IMS user is currently registered, and, if so, forwards the SIP "invite" message to the SIP client(s) running on the registered user's Wi-Fi handset 24. If the call request is answered by the client in response to the SIP "invite" message, the call is set up accordingly. However, if the user is not currently registered or the user declines the call or fails to answer within a specified period, voice call server 178 forwards the SIP "invite" message to an alternative destination in (for example) GSM network 12 as described above under "Outgoing Call from Wi-Fi handset". Voice call server 178 knows where to re-direct the call based on information contained in the user profile. Voice call server 178 then waits until it receives a SIP "ringing" message from GSM network 12 at which point it starts a timer.

Operation of voice call server 178 from this point in the call set-up process will depend on whether the voice call server is operating in a first phase or a second phase according to the invention.

Phase 1

Figure 2:
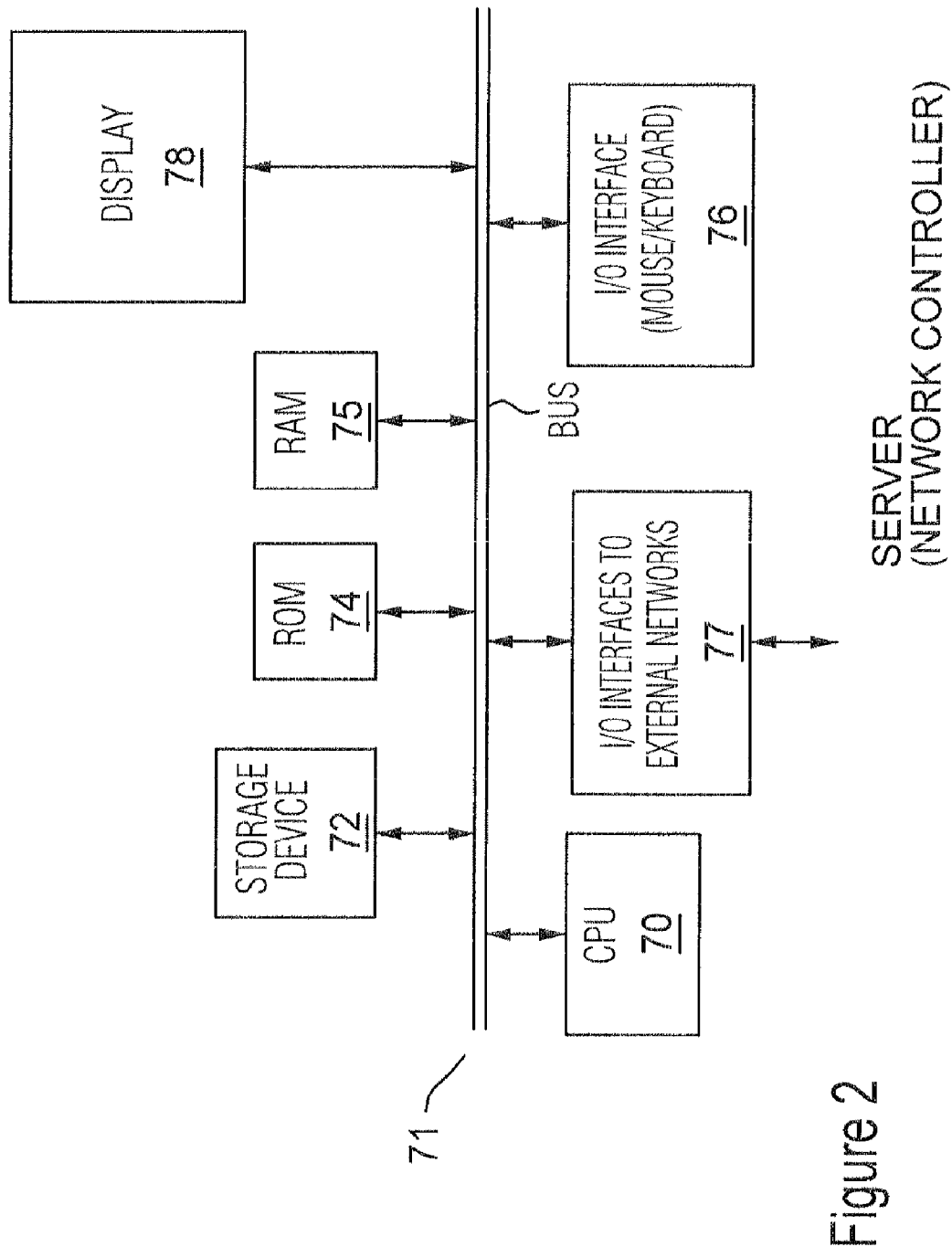
FIG. 2 shows a schematic of a server for implementing the exemplary embodiments.

In the first phase, voice call server 178 monitors, through notifications provided by GSM network 12, the behavior of the GSM network upon receiving a call redirected from IMS network 16. The notifications take the form of SIP "ringing" and "answer" messages. Receipt of the SIP "ringing" message has been described, above. The SIP "answer" message (i.e.: "200 OK") may be triggered by the call being answered in GSM network 12 either by a user (ideally the intended subscriber) actually answering the ringing phone or by a messaging service, such as voicemail function 140. According to a preferred embodiment, voice call server 178 stops the timer on receipt from GSM network 12 of the "answer" message and stores the measured time-to-answer delay in a store dedicated to the user, for example, in hard disk drive or volatile semiconductor memory device (as illustrated in FIG. 2 by storage device 72 and RAM 75).

At the end of the first phase (for example, after a specified number of time-to-answer delay values have been recorded for the user) voice call server 178 determines the maximum value of delay before answer for the user exhibited by GSM network 12. Given the presence of messaging service 140 in GSM network 12, this maximum value of delay before answer will normally correspond to (and, in any case, not be greater than) the delay before the GSM messaging service answers a call redirected from IMS network 16. Voice call server 178 processes the recorded delay values and defines a delay period equal to the maximum recorded value of delay before answer less a specified margin (e.g. one second, or one ring-period) and stores this value for future use. Suitable storage may be found in the user profile in HSS 168, or alternatively, in a separate database managed by voice call server 178.

Phase 2

In the second phase, voice call server 178 continues to monitor, through the SIP "ringing" and "answer" messages received from GSM network 12, the behavior of GSM network 12 upon receipt of a call redirected from IMS network 16. In the second phase, however, voice call server 178 runs a second timer set to the delay period determined at the end of the first phase. The second timer is started on receipt of an SIP "ringing" message and either generates a signal or is checked to indicate when the delay period elapses.

Successful Redirection Case (Call to Wi-Fi handset redirected to GSM). For the successful redirection case, voice call server 178 receives notification from GSM network 12 that the call has been answered at the alternative destination in GSM network 12 before the timer has indicated that the delay period has elapsed. In this case, no further action is taken for that call, which is assumed to have been correctly terminated in GSM network 12.

Unsuccessful Redirection Case (Call to Wi-Fi handset redirected to GSM). For the unsuccessful redirection case, however, the timer indicates that the delay period for the call has elapsed before any "answer" message for that call has been received from GSM network 12. Voice call server 178 determines that the unanswered call should be diverted back to a messaging service (i.e.: voicemail function 170) in IMS network 16 that is associated with the Wi-Fi handset that was the original destination for the call. This is done to prevent the call being answered by a messaging service (i.e.: voicemail function 140) in the "wrong" network, i.e.: in this case, GSM network 12. Voice call server 178 cancels the forwarded call to the GSM network (sends a SIP "bye" message), dials the number for IMS messaging service 170 and diverts the call to the messaging service. The IMS messaging service accepts the diverted call request and the caller is connected to voicemail server 172.

Minimum Delay Timer (Incoming Call to Wi-Fi Handset)

A further embodiment addresses the case where the mobile terminal in GSM network 12, to which the call is redirected, is unreachable. When a terminal is marked as unreachable, GSM network 12 does not even attempt to put the call through to the terminal but immediately forwards it to the messaging service (e.g., voicemail). An additional, minimum-delay timer (not shown) is provided according to this embodiment to detect calls which are answered in GSM network 12 within a very short time (the minimum-delay period) of the call being redirected to GSM network 12. The minimum-delay timer is additional to the maximum-delay timer, described above. The minimum-delay period is selected to be longer than the delay required to forward a call to the messaging service of GSM network 12 when the mobile terminal in GSM network 12, to which the call is redirected, is marked as unreachable.

Successful Redirection Case (Minimum Delay Timer). For the successful redirection case, voice call server 178 receives notification from GSM network 12 that the call has been answered at the alternative destination in GSM network 12 after the minimum-delay timer has indicated that a pre-specified minimum delay period has elapsed and before the maximum-delay timer has indicated that the delay period has elapsed. In this case, no further action is taken for that call, which is assumed to have been correctly terminated in GSM network 12.

Unsuccessful Redirection Case (Minimum Delay Timer). For the unsuccessful redirection case, however, voice call server 178 receives notification from GSM network 12 that the call has been answered at the alternative destination before the specified minimum delay period for the call has elapsed. Voice call server 178 cancels the forwarded call to the GSM network (sends a SIP "bye" message), dials the number for IMS messaging service 170 and diverts the call to the messaging service. The IMS messaging service accepts the diverted call request and the caller is connected to voicemail server 172. This is done to prevent the call, originally directed to a destination in IMS network 16 being answered by a messaging service (i.e.: voicemail function 140) in GSM network 12.

GSM Network

FIG. 1b shows a schematic of communications system 10, as in FIG. 1a but now with details of GSM network 12 shown.

GSM handset 22 exchanges radio signals with base transceiver station (BTS) 120, operating under control of base station controller (BSC) 122 of GSM network 12. GSM network 12 also comprises home location register (HLR) 124 which includes a database (not shown) of information on users of the mobile network. HLR 124 stores user information, including location, account status and preferences and is maintained by the network operator subscribed to by the user. Both BSC 122 and HLR 124 interact with mobile switching centre (MSC) 126, which is a switch used for call control and processing. MSC 126 also serves as a point-of-access to PSTN 18 via gateway mobile switching centre (GMSC) 130. MSC 126 is associated with visitor location register (VLR) 125 which stores information about all the mobiles that are currently under the control of MSC 126.

GSM network 12 uses HLR 124 to obtain up-to-date location information about a user so that a call can be delivered to the user regardless of their location in the telephone network at the time. GMSC 130 provides an interface with PSTN 18 and determines the appropriate MSC 126 to which an incoming call to a mobile user should be directed (i.e., the MSC 126 at which the called user is currently recorded as being located). GSM network 12 queries HLR 124 to determine which MSC (out of a plurality represented in FIG. 1b by MSC 126) is currently providing service to the user.

Successful Call to GSM.

A subscriber initiates a call in an originating network (e.g., IMS 16, PSTN 18 or another mobile network—not shown) to a subscriber in GSM network 12 by dialing the GSM phone number allocated to the called subscriber. The originating network uses the GSM phone number to locate the GMSC for the service provider serving the called subscriber. Once the appropriate GMSC (represented in the drawings by GMSC 130) has been identified, the originating network sends to it an ISUP "initial address message".

GMSC 130 requests routing information for the called GSM subscriber from the Home Location Register (represented in the drawings by HLR 124) allocated to the called subscriber. HLR 124 uses the dialed number carried in the "initial address" message to locate a record for the subscriber. The SS7 address for the MSC and VLR serving the subscriber (represented in the drawings by MSC 126 and VLR 120) is obtained from this record.

HLR 124 then contacts MSC/VLR 126,125 serving the subscriber and requests the assignment of a temporary roaming phone number to the called subscriber. In response to the request from HLR 124, MSC/VLR 126,125 allocates a temporary roaming phone number (MSR—Mobile Station Roaming Number) to the called subscriber and passes it to HLR 124, which passes it in turn to GMSC 130. GMSC 130 uses the temporary roaming phone number to route the call to MSC/VLR 126,125.

The destination phone is paged, via all base station controllers (BSC) connected to MSC 126. Each BSC (represented in the drawings by BSC 122) connected to MSC 126 sends a "page" message to all cells that serve the subscriber's current location area. The base transceiver stations (represented in the drawings by BTS 120) for each of these cells broadcast the "page" message received from their BSC on a dedicated paging channel which all mobile phones listen to every few seconds.

The destination phone, on finding that an identifier specified in a "page" message matches its own identifier, acknowledges the receipt of the call setup request. MSC 126 receives the acknowledgement and sends an ISUP "address complete" message to GMSC 130, which forwards it to the originating network. When the called subscriber answers the call, an ISUP "answer" message is sent by MSC 126 to GMSC 130. The call is now set up.

The above description relates to a call successfully connected through to a destination in GSM network 12 from a source located in an originating network outside of GSM network 12, for example the originating network being PSTN 18.

Unsuccessful Call to GSM.

We shall now describe how the present invention, for example operating on GMSC 130, enables a call, initially directed (as described, above) to an original destination in mobile GSM network 12 and then redirected to an alternative destination in a second network (e.g.: PSTN 18) and subsequently, upon failure to answer the call in the second network, to be retrieved to GSM network 12 and redirected to a messaging service associated with the original destination in GSM network 12. Rather than being forwarded to a messaging service associated with the second network, which might cause inconvenience to the called subscriber, the call is terminated at a messaging service associated with the called subscriber's handset that was the original destination of the call.

The call may be redirected away from the original destination in GSM network 12 for a number of reasons. The user may not be available to respond to the call. The mobile terminal associated with the original destination may be busy or not on-line so that no valid response is received at MSC 126 to the "page" messages issued by the BSCs. In such a case, i.e.: where no response is received to the "page" messages, GSM network 12 may be provided with an alternative destination, e.g. a "call forward unavailable" number. For the purposes of the present embodiment, we shall describe the case where the "call forward unavailable" number is set to a number registered in PSTN 18.

According to this embodiment, MSC 126 routes the unsuccessful call via GMSC 130 to PSTN 18, where the call setup request is put through to the alternative destination according to the "call forward unavailable" number. MSC 126 receives notification from PSTN 18 that the call setup request has been put through to the alternative destination (e.g.: that ringing signal has been applied to the selected phone in PSTN 18). The notification takes the form of an ISUP "address complete" message. MSC 126 initiates a timer (not shown) on receipt from PSTN 18 of this message.

Operation of GMSC 130 from this point in the call set-up process will depend on whether the GMSC is operating in a first phase or a second phase according to the invention.

Phase 1

In the first phase, MSC 126 monitors, through notifications provided by PSTN 18, the behavior of PSTN 18 upon receiving a call redirected from GSM network 12. The notifications take the form of ISUP "address complete" and "answer" messages. Receipt of the ISUP "address complete" message has been described, above. The ISUP "answer" message may be triggered by the call being answered in PSTN 18 either by a user (ideally the intended subscriber) actually answering the ringing phone or by a messaging service, such as an answerphone. According to a preferred embodiment, MSC 126 stops the timer on receipt from PSTN 18 of the "answer" message.

Still in the first phase, MSC 126 informs GMSC 130 of the time intervals recorded between the receipt of the ISUP "address complete" and "answer" messages pertaining to each redirected call. GMSC 130 creates a record of the delays before each redirected call is answered in PSTN 18 and determines the maximum value of delay before answer. GMSC 130 records the delay values either in hard disk drive or volatile semiconductor memory device (as illustrated in FIG. 2 by storage device 72 and RAM 75). Given the presence of a messaging service in PSTN 18, this maximum value of delay before answer will normally correspond to (and, in any case, not be greater than) the delay before the PSTN messaging service (not shown) answers a call. After having received a quantity of delay times, GMSC 130 provides MSC 126 with a delay period calculated to be less than the maximum recorded value of delay before answer. MSC 126 stores the delay period provided by GMSC 130 either in hard disk drive or volatile semiconductor memory device (as illustrated in FIG. 2 by storage device 72 and RAM 75).

Phase 2

In the second phase, GMSC 130 continues to monitor, through the ISUP "address complete" and "answer" messages received from PSTN 18, the behavior of PSTN 18 upon receipt of a call redirected from GSM network 12. In the second phase, however, MSC 126 runs a second timer set to the delay period determined by GMSC 130. The second timer is started on receipt of an "address complete" message and either generates a signal or is checked to indicate when the delay period elapses.

Successful Redirection Case (Incoming Call to GSM Handset).

For the successful redirection case, MSC 126 receives notification from PSTN 18 that the call has been answered at the alternative destination in PSTN 18 before the timer has indicated that the delay period has elapsed. In this case, no further action is taken for that call, which is assumed to have been correctly terminated in PSTN 18.

Unsuccessful Redirection Case (Incoming Call to GSM Handset).

For the unsuccessful redirection case, however, the timer indicates that the delay period for the call has elapsed before any "answer" message for that call has been received from PSTN 18. In this case, MSC 126 determines that the call should now be diverted back to messaging service 140 in GSM network 12 associated with the mobile phone that was the original destination of the call. This is done to prevent the call being answered by a messaging service in PSTN 18. MSC 126 dials the number for GSM messaging service 140—in a similar way to the traditional mobile network diverting a call to a call forward number—and diverts the call to the messaging service.

According to a preferred embodiment, the delay period determined by GMSC 130 is stored in HLR 124 allocated to the called subscriber (alongside other "call forward" timeouts for that subscriber, i.e., timeouts for call forward busy, call forward unreachable, etc.).

Minimum Delay Timer (Incoming Call to GSM Handset).

A further embodiment addresses the case where the call, having been redirected to PSTN 18, is immediately forwarded in PSTN 18 to a messaging service (e.g. voicemail). This could occur when the subscriber does not want to be disturbed and has instructed PSTN 18 to divert all calls to the destination to voicemail without first ringing the subscriber's handset. An additional, minimum-delay timer (not shown) is provided according to this embodiment to detect calls which are answered in PSTN 18 within a very short time (the minimum-delay period) of the call being redirected from GSM network 12. The minimum-delay timer is additional to the maximum-delay timer, described above. The minimum-delay period is selected to be longer than the delay required to forward a call to the messaging service of PSTN 18 when this is done immediately on the call arriving in PSTN 18.

As will be understood by those skilled in the art, GMSC 130, MSC 126 and voice call server 178 described above may be implemented as one or more commercially available server or similar general-purpose processing means, as illustrated in FIG. 2. FIG. 2 shows a typical architecture for a server suitable for implementing the network controller according to a further embodiment of the invention. In practice, a number of such servers will typically be required. The server comprises a central processing unit (CPU) 70 for executing software programs and managing and controlling the operation of the processing means. The CPU 70 is connected to a number of devices via a bus 71, the devices including one or more storage devices 72, for example: a hard disk drive, floppy disk drive, optical disk drive and/or magnetic tape drive and memory devices including ROM 74 and RAM 75 for storing system and application software and values for delay time and delay period. The server further includes communications interfaces 77 for interfacing to external network components (for example, other components within IMS network 16 or GSM network 12). The server can also include user input/output devices such as a mouse and keyboard (not shown) connected to the bus 71 via an input/output port 76, as well as a display 78. It will be understood by the skilled person that the above described architecture is not limiting, but is merely an example of typical server architecture. It will be further understood that the described server has all the necessary operating and application software to enable it to fulfill its purpose.

As will be understood by those skilled in the art, the invention may be implemented in software loaded onto one or more general purpose computers, as illustrated by way of example in FIG. 2. Any or all of the software may be contained on a computer program product, including optically readable or magnetic media, such as a floppy disc, CD-ROM, or magnetic tape so that the program can be loaded onto one or more general purpose computers.

The above embodiments are to be understood as illustrative examples of the invention. Further embodiments of the invention are envisaged and will be evident to the skilled reader. It is to be understood that any feature described in relation to any one embodiment may be used alone, or in combination with other features described, and may also be used in combination with one or more features of another of the embodiments, or any combination of the embodiments. Furthermore, equivalents and modifications not described above may also be employed without departing from the scope of the invention, which is defined in the accompanying claims.

Although described above with reference to GSM and Wi-Fi, the skilled reader would understand that the call control arrangements, described above, may equally be applied to a code division multiple access (CDMA), time division multiple access (TDMA), or other types of mobile communications network or, indeed, to various forms of fixed networks. Although described above with reference to calls being redirected—on no answer in the second network—to a message service, the invention is equally applicable where the destination for calls redirected on no answer in the second network is another form of telephony device such as a telephone terminal or pre-recorded announcement. Similarly, the destination of calls retrieved from the second network is not limited to a message service and may, alternatively, comprise another form of telephony device such as a telephone terminal (e.g.: a "parental hotline" to a parent of the owner of the called terminal) or pre-recorded announcement. The two timers, described above, could be located elsewhere than the MSC or voice call server (depending on the network). The skilled reader would appreciate that different means to allow a first network to monitor processing activity in a second network relating to a call redirected from the first network may be appropriate, depending on the different types of networks and their interaction. The measurement of delays-to-answer in the second network may be started from a number of reference points or from a range of events, including the transfer by the first network of the call to the second network. Reference in the above to a handset will be understood to include any suitable form of communications terminal, including conventional telephones and telephone-enabled devices such as portable computers. Determination of a value for the delay period to be used in the second phase could involve a variety of statistical treatments of measured values of delay time, taking the average of the highest n values or smoothing to reduce the influence of spurious values.

ABBREVIATIONS

BGCF Breakout Gateway Control Function
BSC Base Station Controller
BTS Base Transceiver Station
CSCF Call Session Control Function
GMSC Gateway Mobile Switching Centre
HLR Home Location Register
HSS Home Subscriber Server
I-CSCF Interrogating-CSCF
MGCF Media Gateway Control Function
MGW Media Gateway
MSC Mobile Switching Centre
P-CSCF Proxy CSCF
PSTN Public Switched Telephone Network
S-CSCF Serving-CSCF
SGW Signalling Gateway
SIP Session Initiation Protocol
SIP-AS SIP Application Server

What is claimed is:

1. A method of call control including comprising:
    in a first network, configuring and using at least one digital data processor and associated memory for
    detecting calls directed to a destination in the first network;
        redirecting a plurality of the calls to a destination in a second network;
        in a first phase, for each call of a first set of the plurality of calls redirected to the second network, recording a time delay before the call is answered in the second network; and
        setting a delay period to a value less than a maximum value of the time delays recorded in the first phase; and
        in a second phase, for a second set of the plurality of calls, comprising calls redirected to the second network subsequent to the calls of the first set, when a call of the second set redirected to the second network is not answered in the second network within the delay period, redirecting in the first network the call to an alternative destination associated with the first network.

2. The method of claim 1, in which each time delay is measured in the first network starting from receipt by the first network of information from the second network indicating that a ringing signal for the redirected call has been applied to the destination in the second network.

3. The method of claim 1, in which each time delay is measured in the first network starting from the transfer by the first network of the call to the second network.

4. The method of claim 1, in which each time delay is measured in the first network terminating on receipt by the first network of information from the second network indicating that the redirected call has been answered in the second network.

5. The method of claim 1, in which the delay period is set to a value equal to one of one second and one ring period less than the maximum value of the recorded time delays.

6. The method of claim 1 including, when a call of the second set redirected to the second network is answered in the second network within a second delay period shorter than the delay period, redirecting in the first network the call to an alternative destination associated with the first network.

7. The method of claim 1, in which the recording of time delays is carried out by a call management system remote from the user.

8. The method of claim 1, in which the delay period is increased over time until the redirection of calls of the second set to the alternative destination associated with the first network ceases; at which point, the delay period is decreased over time until the redirection of calls of the second set to the alternative destination associated with the first network recommences.

9. The method of claim 8 including, upon detection of a sequence of calls of the second set, none of which is redirected to the alternative destination associated with the first network, resetting the delay period to a value previously set to be less than a maximum value of the time delays recorded in the first phase.

10. The method of claim 1, in which the first phase is repeatedly periodically to provide a revised value of the delay period for use in a new occurrence of the second phase.

11. The method of claim 1 including, upon detection of a sequence of calls of the second set, none of which is redirected to the alternative destination associated with the first network, repeating the first phase and resetting the delay period.

12. The method of claim 1, in which the destination in the first network comprises a terminal operated by a first user and the destination in the second network comprises a terminal operated by a second user.

13. The method of claim 1, in which the alternative destination associated with the first network comprises a message service.

14. A first communications network comprising:
a network controller arranged in use to detect calls directed to a destination in the first network; and to redirect a plurality of the calls to a destination in a second network; in which the network controller comprises:
a first timer arranged in use to record the time delay before each call of a first set of the plurality of calls redirected to the second network is answered in the second network;
a timer controller arranged in use to set a second timer to a delay period value less than the maximum value of the recorded time delays; and
a switch arranged in use to redirect an unanswered call to an alternative destination associated with the first network;
in which an unanswered call is a call from a second set of the plurality of calls, comprising calls redirected to the second network subsequent to the calls of the first set that is not answered in the second network within the delay period.

15. A first communications network as claimed in claim 14 in which the timer controller is arranged in use to set a third timer to a second delay period shorter than the delay period; in which the switch is arranged in use to redirect a call that is answered in the second network within the second delay period to an alternative destination associated with the first network.

16. A non-transitory computer readable medium storing processor executable instructions for causing the method of claim 1 to be carried out when run on a general purpose computer.

* * * * *